US009836323B1

(12) United States Patent
Tsirkin et al.

(10) Patent No.: US 9,836,323 B1
(45) Date of Patent: Dec. 5, 2017

(54) SCALABLE HYPERVISOR SCHEDULING OF POLLING TASKS

(71) Applicant: Red Hat, Inc., Raleigh, NC (US)

(72) Inventors: Michael Tsirkin, Lexington, MA (US); Bandan Das, Wakefield, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 15/442,345

(22) Filed: Feb. 24, 2017

(51) Int. Cl.
　　G06F 9/46　　　(2006.01)
　　G06F 9/455　　(2006.01)
　　G06F 3/00　　　(2006.01)
　　G06F 13/24　　(2006.01)
　　G06F 9/48　　　(2006.01)

(52) U.S. Cl.
　　CPC ........ G06F 9/45558 (2013.01); G06F 9/4881 (2013.01); *G06F 2009/45579* (2013.01)

(58) Field of Classification Search
　　None
　　See application file for complete search history.

(56) References Cited

U.S. PATENT DOCUMENTS

| | | | |
|---|---|---|---|
| 7,613,847 B2 * | 11/2009 | Kjos | .................. G06F 12/1081 710/22 |
| 7,962,738 B2 | 6/2011 | Zimmer et al. | |
| 8,544,010 B2 | 9/2013 | Huang et al. | |
| 8,775,590 B2 | 7/2014 | Devarakonda et al. | |
| 9,164,789 B2 | 10/2015 | Tsirkin | |
| 9,367,345 B1 | 6/2016 | Tsirkin | |
| 9,442,748 B2 | 9/2016 | Burshan et al. | |
| 2015/0347169 A1 | 12/2015 | Tsirking | |
| 2016/0103774 A1 * | 4/2016 | Bradbury | ............ G06F 9/45558 710/33 |
| 2016/0124763 A1 | 5/2016 | Tsirkin | |

OTHER PUBLICATIONS

Gavrilovska, Ada, et al., "High-Performance Hypervisor Architectures: Virtualization in HPC Systems", www.cc.gatech.edu/~adit262/docs/HPHA-HPCVirt2007.pdf, Mar. 20, 2007, 8 pages.

Ki, Sisu, et al., "RT-Xen: Towards Real-Time Hypervisor Scheduling in Xen", www.utdallas.edu/~cxl137330/courses/fall14/RTS/papers/8a.pdf, 10 pages.

* cited by examiner

*Primary Examiner* — Bing Zhao
(74) *Attorney, Agent, or Firm* — Lowenstein Sandler LLP

(57) ABSTRACT

Systems and methods for hypervisor scheduling of polling tasks are disclosed. In one implementation, responsive to determining that no input/output (I/O) worker tasks associated with virtual machines are running on a processor of a host computer system running a plurality of virtual machines, callback dispatcher task may be invoked by the processor. The callback dispatcher task may identify an entry of a callback list, wherein the entry references an input/output (I/O) worker task associated with a virtual machine of the plurality of virtual machines. The callback dispatcher task may further invoke a callback code referenced by the entry of the callback list. Responsive to identifying a pending I/O request, the callback code may wake up the input/output (I/O) worker task associated with the entry of the callback list.

20 Claims, 6 Drawing Sheets

SCALABLE HYPERVISOR SCHEDULING OF POLLING TASKS

TECHNICAL FIELD

The present disclosure is generally related to virtualized computer systems, and more particularly, to hypervisor-performed scheduling of polling tasks.

BACKGROUND

Virtualization may be viewed as abstraction of some physical components into logical objects in order to allow running various operating systems concurrently and in isolation from other operating systems on one or more interconnected physical computer systems. Virtualization allows consolidating multiple physical servers into one physical server running multiple virtual machines in order to improve the hardware utilization rate. Virtualization may be achieved by running a layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

"Paravirtualization" herein shall refer to a virtualization technique in which the guest (i.e., virtual machine) operating system is aware of the virtualized environment and the guest code is modified to move some input/output (I/O) operations to the hypervisor in order to avoid at least some context switches.

BRIEF DESCRIPTION OF THE DRAWINGS

The present disclosure is illustrated by way of examples, and not by way of limitation, and may be more fully understood with references to the following detailed description when considered in connection with the Figures, in which.

DETAILED DESCRIPTION

Figure 1:
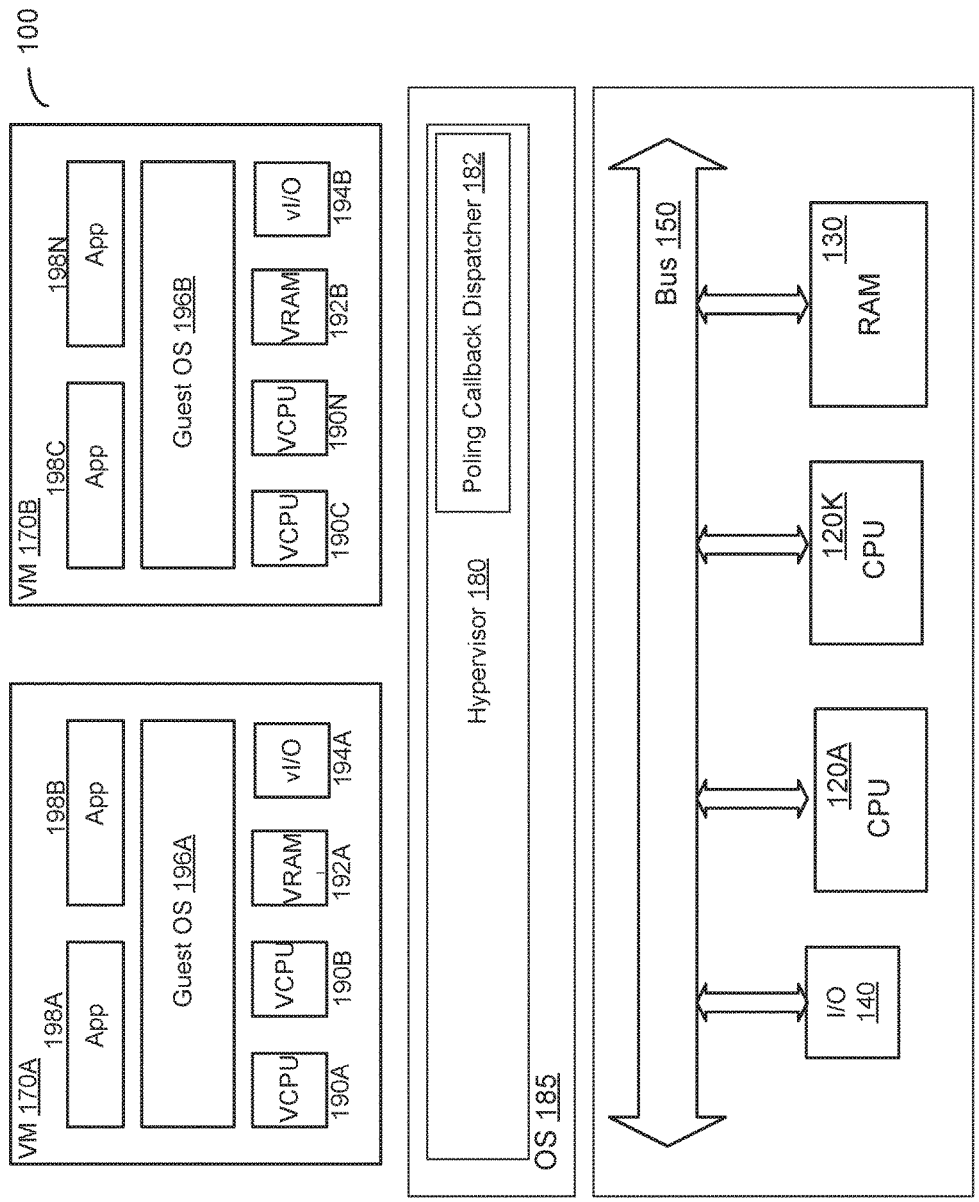
FIG. 1 depicts a high-level component diagram of an illustrative example of a computer system 100 operating in accordance with one or more aspects of the present disclosure.

A common approach to improving the efficiency of input/output (I/O) operations performed by virtual machines (VMs) in a paravirtualized environment involves implementing a per-VM or a per-virtual processor polling task running within the privileged hypervisor context for performing the I/O operations by communicating with physical I/O devices on behalf of the associated virtual machine or virtual processor (also referred herein as a "virtual central processing unit" or vCPU). As the term suggests, the polling task would repeatedly poll for I/O requests. Thus, if multiple virtual machines (or vCPUs) are running on the same host CPU, polling on behalf of one virtual machine (or vCPU) would prevent other virtual machines (or vCPUs) from running until the current polling task is eventually preempted. Therefore, while providing reasonable latency of I/O operations, the common polling-based approach is not suited well for resource over-commitment and scalability.

The systems and methods of the present disclosure alleviate these and other deficiencies of conventional hypervisor-based polling methods, by providing a method for efficient scheduling of polling tasks by the hypervisor. In accordance with one or more aspects of the present disclosure, the hypervisor may implement an I/O worker task for each running virtual machine. When scheduled, such an I/O worker task processes any pending I/O requests associated with the respective virtual machine. In the absence of pending I/O requests, the I/O worker task adds an entry to a list of polling callbacks, which is maintained by the hypervisor as a global (i.e., per-host) list or as multiple lists, such that each list is associated with a respective host CPU. "Callback" herein shall refer to an executable code within the I/O worker task, the address of which is passed as an argument to a callback dispatcher task, which is expected to call back (i.e., execute) the callback code, as described in more detail herein below.

The callback dispatcher task may be implemented by the hypervisor as a global (i.e., per-host) task or as multiple tasks, such that each task is associated with a host CPU. The callback dispatcher task may be scheduled to run when no I/O worker task is active on a given CPU. When scheduled, the callback dispatcher task traverses the callback list, and for each entry on the list invokes the callback code referenced by the list entry. In certain implementations, before invoking the callback code, the callback dispatcher task may remove the entry from the list if the I/O worker task that has created the entry is running on a host CPU which is different from the host CPU that is associated with the callback list that is currently being processed, as described in more detail herein below.

Once invoked, the callback code may check for pending I/O requests, and if such requests are found, the callback code may remove the callback entry from the list and, if the I/O worker task that has created the callback entry is not already active on another host CPU, wake up the I/O worker task. Otherwise, the callback list may be traversed until an I/O worker task is waken up or until a pre-defined number of list traversal iteration have been performed. In the latter case, the host CPU associated with the callback list may be quiesced (e.g., by causing the host CPU to execute the HLT instruction which halts the processor), as described in more detail herein below.

Thus, the systems and methods described herein represent improvements to the functionality of general purpose or specialized computing devices, by employing a hypervisor to effectively schedule polling tasks that perform I/O operations on behalf of virtual machines. The systems and methods described herein may be implemented by hardware (e.g., general purpose and/or specialized processing devices, and/or other devices and associated circuitry), software (e.g., instructions executable by a processing device), or a combination thereof. Various aspects of the above referenced methods and systems are described in details herein below by way of examples, rather than by way of limitation.

FIG. 1 depicts a high-level component diagram of an illustrative example of a computer system 100 operating in accordance with one or more aspects of the present disclosure. Computer system 100 may include one or more processors 120 communicatively coupled to memory devices 130 and input/output (I/O) devices 140 via a system bus 150.

Examples of "processors" (also referred herein as "processing devices" or CPUs) include various devices that are capable of executing instructions encoding arithmetic, logical, or I/O operations. In an illustrative example, a processor may follow Von Neumann architectural model and may include an arithmetic logic unit (ALU), a control unit, and a plurality of registers. In another aspect, a processor may be a single core processor which is capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket).

Examples of "memory devices" include volatile or non-volatile memory devices, such as RAM, ROM, EEPROM, or any other devices capable of storing data. Examples of "I/O devices" include devices providing an interface between a processor and an external device capable of inputting and/or outputting binary data.

Computer system 100 may run one or more virtual machines 170A-170N, by executing a virtual machine manager 180, often referred to as "hypervisor," above the hardware and below the virtual machines, as schematically illustrated by FIG. 1. In one illustrative example, the hypervisor 180 may be a component of operating system 185 executed by the host computer system 100. Alternatively, the hypervisor 180 may be provided by an application running under the host operating system 185, or may run directly on the host computer system 100 without an operating system beneath it. The hypervisor 180 may abstract the physical layer, including the processors 120, the memory 130, and the I/O devices 140, and present this abstraction to the virtual machines 170A-170N as virtual devices. A virtual machine 170 may execute a guest operating system 196 which may utilize the underlying virtual processors (also referred to as virtual central processing units (vCPUs)) 190, the virtual memory 192, and the virtual I/O devices 194. One or more guest applications 198A-198N may be running on a virtual machine 170 under a guest operating system 196. Guest operating system and guest applications are collectively referred to herein as "guest software."

In certain implementations, processor virtualization may be implemented by the hypervisor's scheduling time slots on one or more physical processors for virtual processors. In an illustrative example, a virtual processor may be implemented by a processing thread that may be scheduled to run on one of the host physical processors.

Device virtualization may be implemented by intercepting virtual machine memory read/write and/or input/output (I/O) operations with respect to certain memory and/or I/O port ranges, and by routing hardware interrupts to a virtual machine associated with the corresponding virtual device. Memory virtualization may be implementing by a paging mechanism allocating the host RAM to virtual machine memory pages and swapping the memory pages to a backing storage when necessary.

The computer system 100 may facilitate input/output (I/O) operations performed by virtual machines (VMs) by employing a callback dispatcher 182 operating in accordance with one or more aspects of the present disclosure. In certain implementations, the callback dispatcher 182 may be implemented as a software component invoked by the hypervisor 180. Alternatively, functions of callback dispatcher 182 may be performed by hypervisor 180.

Figure 2:
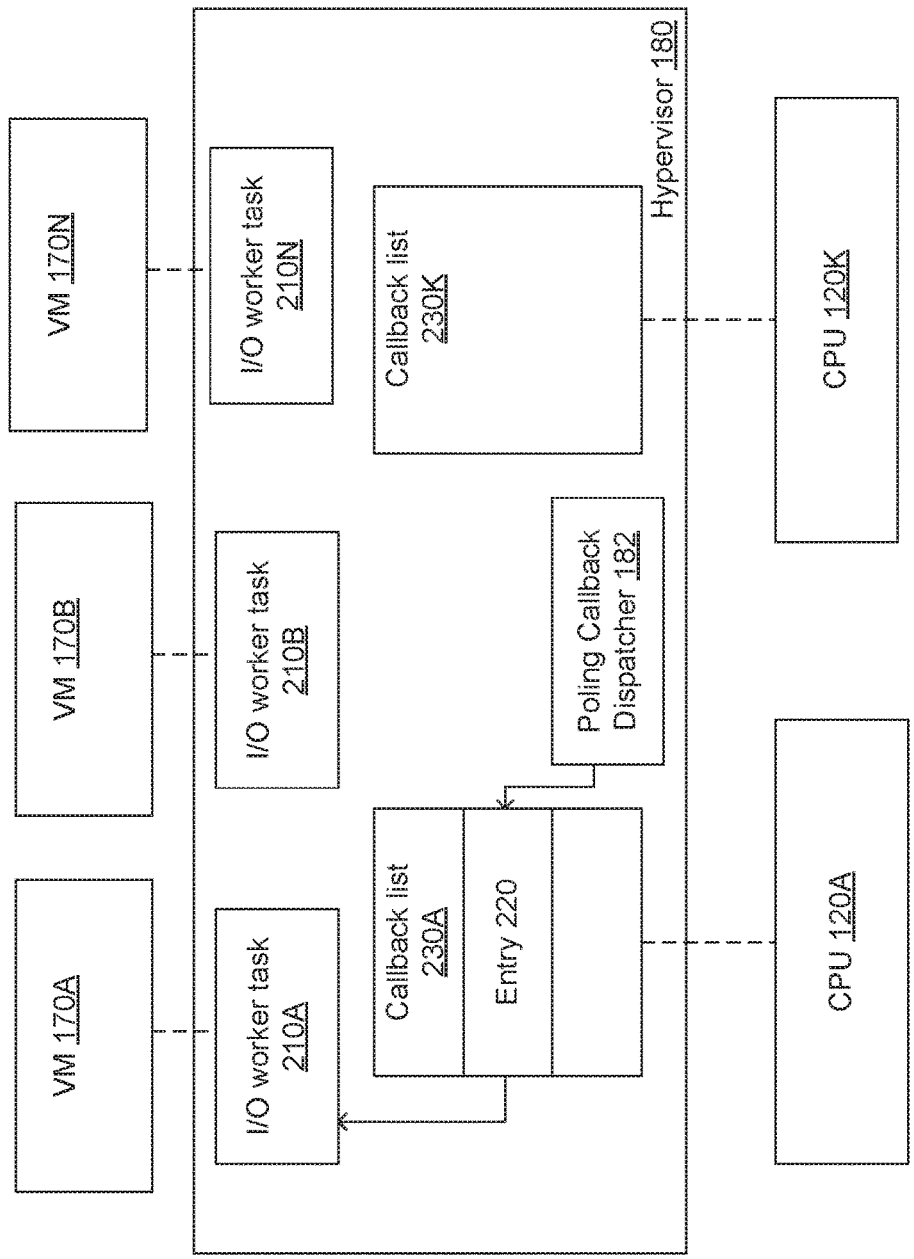
FIG. 2 schematically illustrates data structures and sequence of operations performed by the methods operating in accordance with one or more aspects of the present disclosure.

FIG. 2 schematically illustrates data structures and sequence of operations performed by the methods operating in accordance with one or more aspects of the present disclosure. In the illustrative example of FIG. 2, callback dispatcher 182 hypervisor 180 may manage a plurality of virtual machines 170A-170N which may be scheduled to run on the host CPUs 120A-120K. The hypervisor 180 may implement an I/O worker task 210A-210N for each of virtual machines 170A-170N. When scheduled, an I/O worker task 210A processes any pending I/O requests associated with the respective virtual machine 170A. In the absence of pending I/O requests, the I/O worker task 210A adds an entry 220 to a callback list 230A storing a plurality of references to polling callbacks. Each reference identifies an executable code within the I/O worker task 210 that has created the list entry.

In certain implementations, the hypervisor 180 may maintain a global (i.e., per-host) callback list 230. Alternatively, the hypervisor 180 may maintain multiple callback lists 230A-230K, such that each callback list 230A-230K is associated with a respective host CPU 120A-120K. In the latter case, in the absence of pending I/O requests, the I/O worker task 210A adds an entry 220 to a callback list 230A that is associated with the host CPU 120A on which the I/O worker task 210A is running.

In certain implementations, the hypervisor 180 may maintain a global (i.e., per-host) callback dispatcher task 182. Alternatively, the hypervisor 180 may maintain multiple callback dispatcher tasks 182A-182K, such that each callback dispatcher task 182A-182K is associated with a respective host CPU 120A-120K. The callback dispatcher task 182 may be scheduled to run when no I/O worker task 210 is active on a given CPU.

When scheduled, the callback dispatcher task 182 may traverse the associated callback list (e.g., callback list 230A), and processes each entry on the list as follows: if the I/O worker task 210A that has created the current entry is running on a host CPU (e.g., CPU 120K), which is different from the host CPU 120A that is associated with the callback list 230A which is currently being processed, the callback dispatcher task 182 removes the current entry from the callback list 230A. Otherwise, callback dispatcher task 182 invokes the callback code referenced by the current list entry.

Once invoked, the callback code may check for pending I/O requests associated with the virtual machine (e.g., virtual machine 170A). If such requests are found, the callback code may remove the callback entry 220 from the callback list 230A and, if the I/O worker task 210A that has created the callback entry 220 is not already active on another host CPU, wake up the I/O worker task 210A.

The callback dispatcher task 182 may continue traversal of the callback list 230A until an I/O worker task 210 is waken up by a callback entry or until a traversal exit condition has been satisfied. Examples of such a condition include performing a certain number of list traversal iterations, or expiration of a certain period of time. If no I/O worker tasks have been waken up and the traversal exit condition has been satisfied, the callback dispatcher task 182 may quiesce the host CPU 120A associated with the callback list 230A (e.g., by causing the host CPU to execute the HLT instruction which halts the processor). Quiescing the vCPU causes it to transition to a low power consumption state, thus improving the overall power efficiency of the system.

Figure 3:
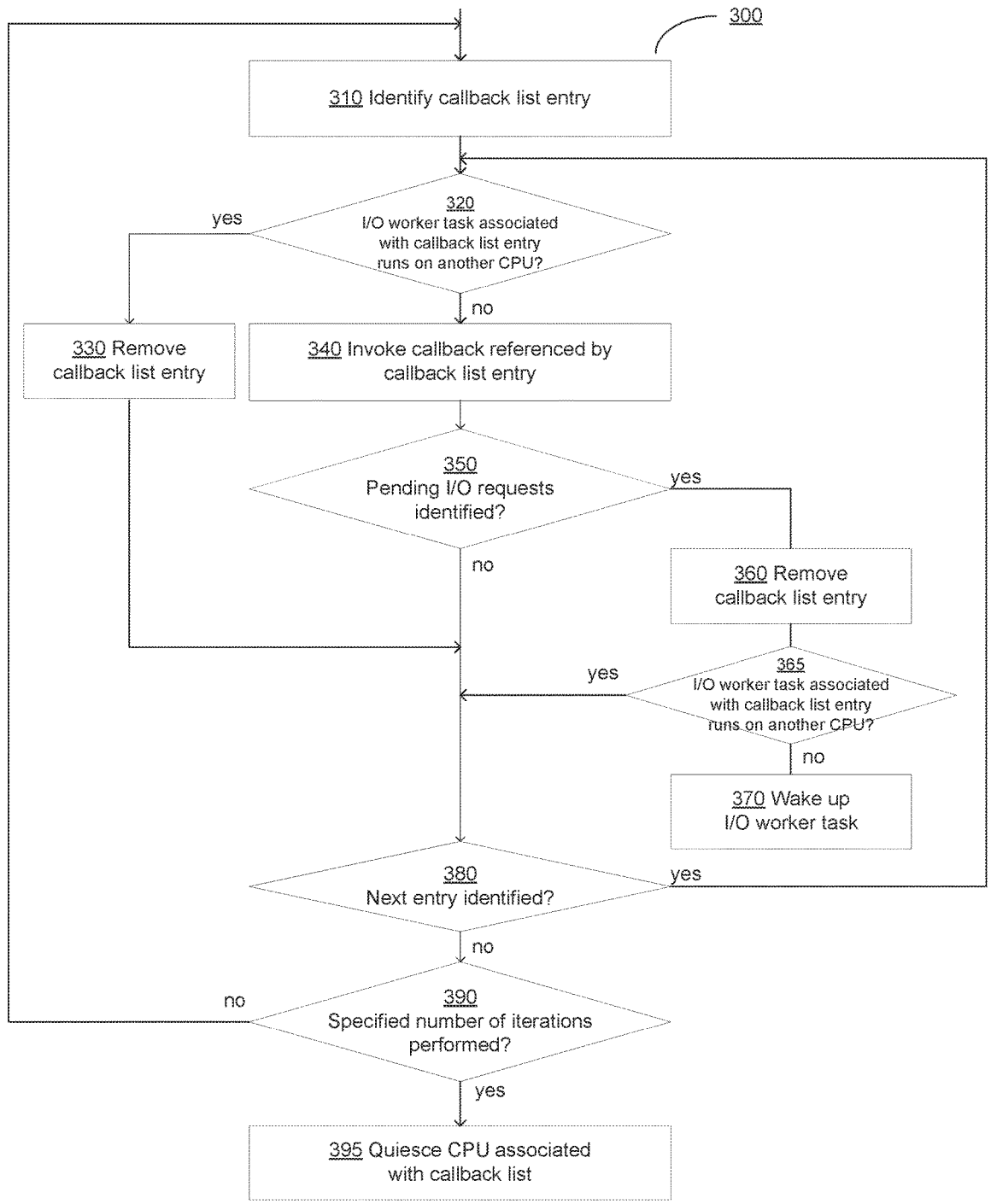
FIG. 3 is a flow diagram of an example method of hypervisor scheduling of polling tasks, in accordance with one or more aspects of the present disclosure.

FIG. 3 is a flow diagram of an example method of hypervisor scheduling of polling tasks, in accordance with one or more aspects of the present disclosure. Method 300 may be performed by processing logic that includes hardware (e.g., circuitry, dedicated logic, programmable logic, microcode, etc.), software (e.g., instructions run on a processor to perform hardware simulation), or a combination thereof. Method 300 or each of its individual functions, routines, subroutines, or operations may be performed by one or more processors of a computer system (e.g., the computer system 500-600 of FIGS. 5-6) implementing the method. In an illustrative example, method 300 may be performed by a single processing thread. Alternatively, method 300 may be performed by two or more processing threads, each thread implementing one or more individual functions, routines, subroutines, or operations of the method. In an illustrative example, he processing threads implementing method 300 may be synchronized (e.g., using semaphores, critical sections, or other thread synchronization mechanisms). Alternatively, the processing threads implementing method 300 may be executed asynchronously with respect to each other. Therefore, while FIG. 3 and the associated description lists the operations of method 300 in certain order, various implementations of the method may perform at least some of the described operations in parallel or in arbitrary selected orders.

Referring to FIG. 3, at block 310, a callback dispatcher task running within the context of the hypervisor of the host computer system implementing the method may identify an entry of the callback list that store a plurality of references to polling callbacks, such that each polling callback is associated with a virtual machine of the plurality of virtual machines running on the host computer system. Each reference identifies an executable code within the I/O worker task that has created the list entry. In certain implementations, the hypervisor may maintain a global (i.e., per-host) callback list. Alternatively, the hypervisor may maintain multiple callback lists, such that each callback list is associated with a respective host CPU, as described in more detail herein above with reference to FIG. 2.

Responsive to determining, at block 320, that the I/O worker task that has created the current list entry is running on a host CPU, which is different from the host that is associated with the callback list that is currently being processed, the callback dispatcher task may, at block 330, remove the current entry from the callback list. Otherwise, at block 340, the callback dispatcher task may invoke the callback code referenced by the current list entry, as described in more detail herein above with reference to FIG. 2.

Responsive to identifying, at block 350, at least one pending I/O request associated with the virtual machine, the callback code may, at block 360, remove the current callback entry from the callback list and, responsive to ascertaining, at block 365, that the I/O worker task that has created the callback entry is not already active on another host CPU, wake up the I/O worker task at block 370, as described in more detail herein above with reference to FIG. 2.

The callback dispatcher task may continue traversal of the callback list. Responsive to identifying, at block 380, the next entry on the callback list, the method may loop back to block 310. Otherwise, responsive to determining, at block 390, that a specified number of list traversal iterations have been performed, the callback dispatcher task may, at block 395, quiesce the host CPU associated with the callback list, as described in more detail herein above with reference to FIG. 2. Responsive to completing the operations of block 395, the method may terminate.

Figure 4:
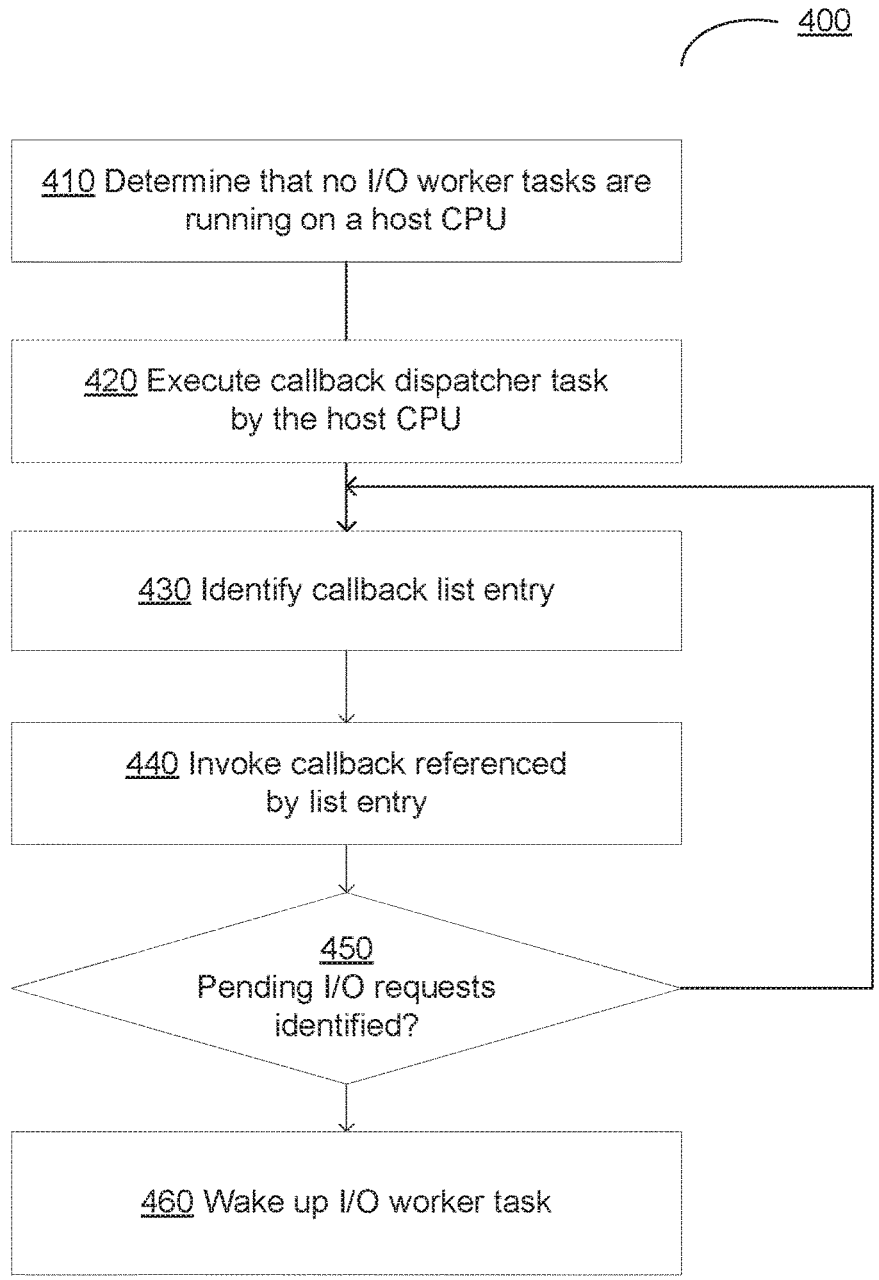
FIG. 4 is a flow diagram of another example method of hypervisor scheduling of polling tasks, in accordance with one or more aspects of the present disclosure.

FIG. 4 is a flow diagram of another example method of hypervisor scheduling of polling tasks, in accordance with one or more aspects of the present disclosure. Method 400 may be performed by processing logic that includes hardware (e.g., circuitry, dedicated logic, programmable logic, microcode, etc.), software (e.g., instructions run on a processor to perform hardware simulation), or a combination thereof. Method 400 or each of its individual functions, routines, subroutines, or operations may be performed by one or more processors of a computer system (e.g., the computer system 500-600 of FIGS. 5-6) implementing the method. In an illustrative example, method 400 may be performed by a single processing thread. Alternatively, method 400 may be performed by two or more processing threads, each thread implementing one or more individual functions, routines, subroutines, or operations of the method. In an illustrative example, he processing threads implementing method 400 may be synchronized (e.g., using semaphores, critical sections, or other thread synchronization mechanisms). Alternatively, the processing threads implementing method 400 may be executed asynchronously with respect to each other. Therefore, while FIG. 4 and the associated description lists the operations of method 400 in certain order, various implementations of the method may perform at least some of the described operations in parallel or in arbitrary selected orders.

Responsive to determining, at block 410, that no input/output (I/O) worker tasks associated with virtual machines are running on a host CPU, a callback dispatcher task may be invoked by the host CPU, at block 420. In certain implementations, the callback dispatcher task may be running within the context of the hypervisor of the host computer system, as described in more detail herein above.

At block 430, the callback dispatcher task may identify an entry of the callback list that store a plurality of references to polling callbacks, such that each polling callback is associated with a virtual machine of the plurality of virtual machines running on the host computer system. Each reference identifies an executable code within the I/O worker task that has created the list entry, as described in more detail herein above with reference to FIG. 2.

At block 440, the callback dispatcher task may invoke the callback code referenced by the current list entry, as described in more detail herein above with reference to FIG. 2.

Responsive to identifying, at block 450, at least one pending I/O request associated with the virtual machine, the callback code may, at block 460, wake up the I/O worker task that has created the callback entry, as described in more detail herein above with reference to FIG. 2. Responsive to completing the operations of block 460, the method may terminate.

Figure 5:
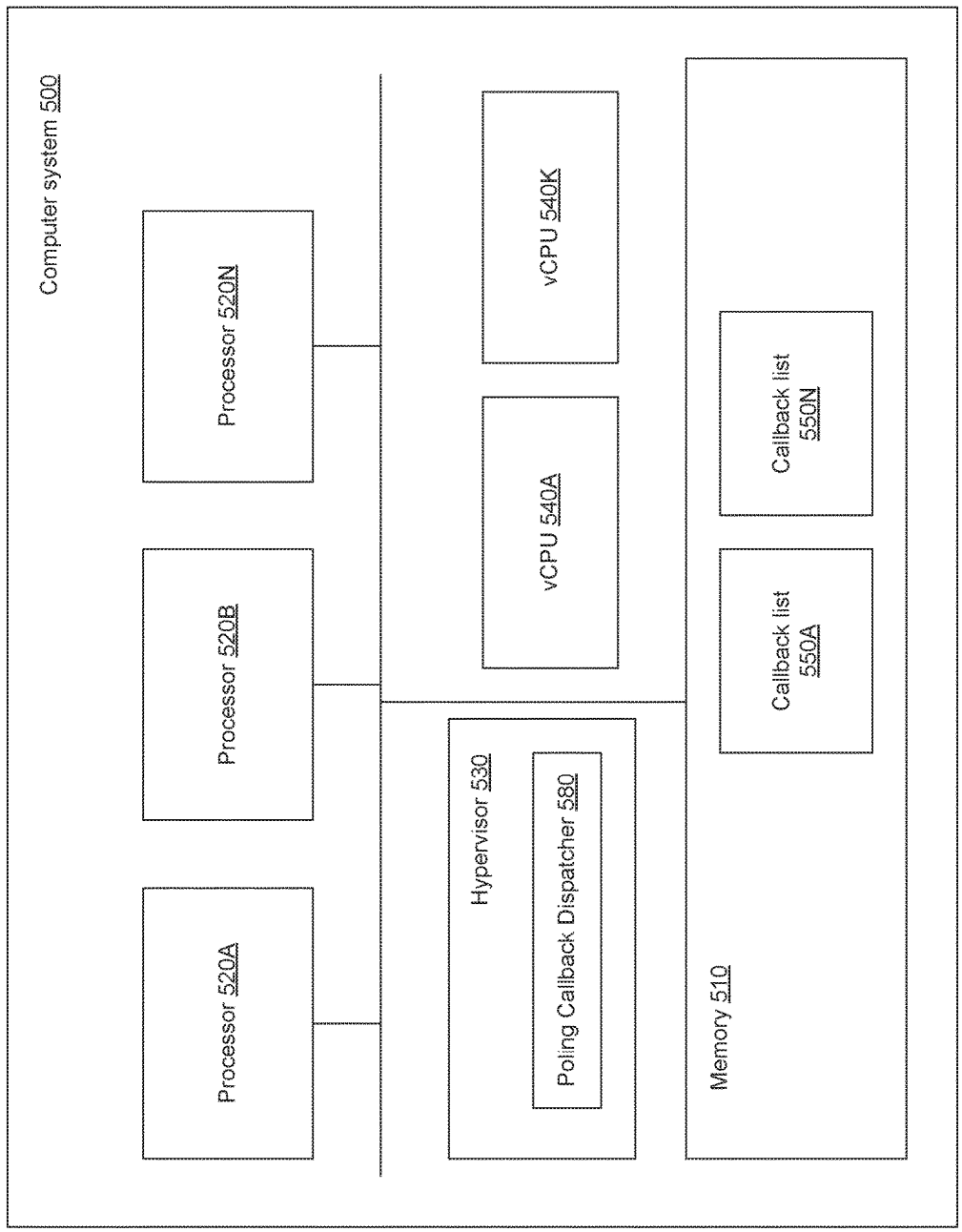
FIG. 5 depicts a block diagram of an illustrative computer system operating in accordance with one or more aspects of the disclosure.

FIG. 5 depicts a block diagram of an illustrative computer system 500 operating in accordance with one or more aspects of the disclosure. In various illustrative examples, computer system 500 may be represented by computer system 100 of FIG. 1. Computer system 500 comprises a memory 510 and one or more physical processors 520A-520N, that are operatively coupled to the memory 510 and execute the code implementing hypervisor 530 and processing threads implementing virtual processors 540A-540K. The memory may store per-CPU callback lists 550A-550N. The hypervisor may include a polling callback dispatcher task 580 operating in accordance with one or more aspects of the present disclosure. In an illustrative example, the polling callback dispatcher task 580 may implement methods 300 and/or 400 of FIGS. 3-4.

Figure 6:
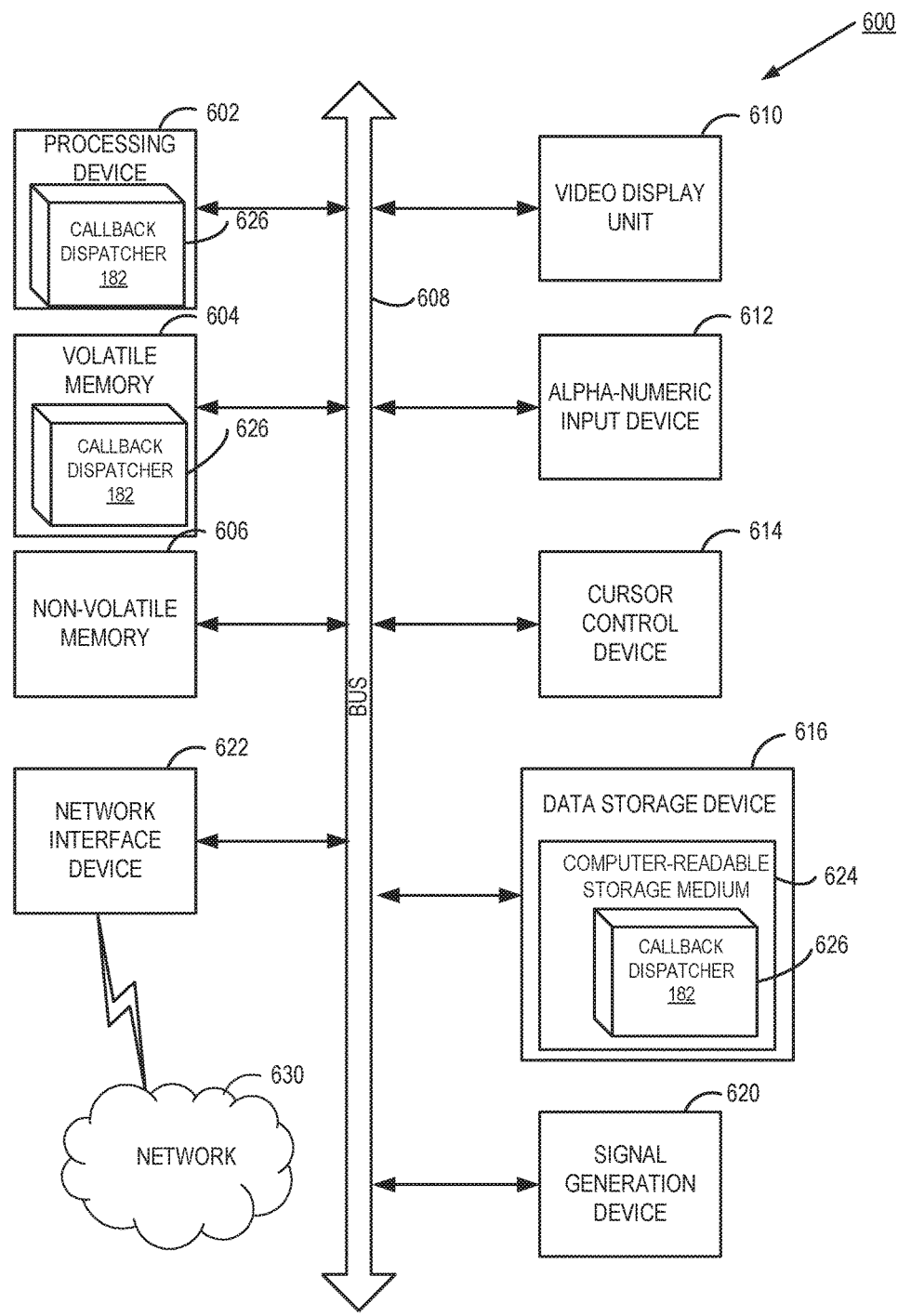
FIG. 6 depicts a block diagram of another illustrative computer system operating in accordance with one or more aspects of the disclosure.

FIG. 6 depicts a block diagram of another illustrative computer system 600 operating in accordance with one or more aspects of the disclosure. In various illustrative examples, computer system 600 may correspond to a computing device within system architecture 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 600 may be connected (e.g., via a network 630, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alpha-numeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300-400 of FIGS. 3-4.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by component modules or functional circuitry within hardware devices. Further, the methods, components, and features may be implemented in any combination of hardware devices and computer program components, or in computer programs.

Unless specifically stated otherwise, terms such as "reading," "setting," "detecting," "obtaining," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300-400 of FIGS. 3-4 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method, comprising:
   determining that no input/output (I/O) worker tasks associated with virtual machines are running on a processor of a host computer system running a plurality of virtual machines;
   invoking, by a hypervisor of the host computer system, a callback dispatcher task;
   identifying, by the callback dispatcher task, an entry of a callback list, wherein the entry references a callback code within an input/output (I/O) worker task running under the hypervisor and associated with a virtual machine of the plurality of virtual machines;
   invoking, by the callback dispatcher task, the callback code referenced by the entry of the callback list; and
   responsive to identifying, by the callback code, a pending I/O request associated with the virtual machine, waking up, by the callback code, the input/output (I/O) worker task referenced by the entry of the callback list.

2. The method of claim 1, further comprising:
   responsive to identifying, by the callback code, the pending I/O request, removing the entry from the callback list.

3. The method of claim 1, wherein the callback dispatcher task is running in a context of the hypervisor of the host computer system.

4. The method of claim 1, further comprising:
   responsive to failing to identify pending I/O requests, retrieving a next entry of the callback list.

5. The method of claim 1, wherein the callback list is represented by a global per-host list.

6. The method of claim 1, wherein the callback list is associated with a first physical processor of the host computer system comprising two or more physical processors.

7. The method of claim 6, further comprising:
   responsive to determining that the I/O worker task associated with the entry is running on a second physical processor of the host computer system, removing the entry from the callback list.

8. The method of claim 6, further comprising:
   responsive to completing a specified numbers of traversals of the callback list, quiescing the first physical processor.

9. The method of claim 6, wherein waking up the input/output (I/O) worker task is performed responsive to determining that the I/O worker task is not running on a second physical processor of the host computer system.

10. The method of claim 1, further comprising:
    responsive to failing to detect, by the I/O worker task, a pending I/O request, creating a new entry in the callback list.

11. A computer system, comprising:
    a memory to store a callback list; and
    a processor, operatively coupled to the memory, to:
    determine that no input/output (I/O) worker tasks associated with a plurality of virtual machines are running on the processor;
    invoke, by a hypervisor running on the computer system, a callback dispatcher task;
    identify, by the callback dispatcher task, an entry of the callback list, wherein the entry references a callback code within an input/output (I/O) worker task running under the hypervisor and associated with a virtual machine of the plurality of virtual machines managed by the hypervisor;
    invoke the callback code referenced by the entry of the callback list; and
    responsive to identifying, by the callback code, a pending I/O request associated with the virtual machine, wake up, by the callback code, the input/output (I/O) worker task referenced by the entry of the callback list.

12. The computer system of claim 11, wherein the processor is further to:
    responsive to identifying, by the callback code, the pending I/O request, remove the entry from the callback list.

13. The computer system of claim 11, wherein the processor is further to:
    responsive to failing to identify pending I/O requests, retrieve a next entry of the callback list.

14. The computer system of claim 11, wherein the callback list is represented by a global per-host list.

15. The computer system of claim 11, further comprising:
    responsive to determining that the I/O worker task associated with the entry is running on a second processor of the host computer system, remove the entry from the callback list.

16. The computer system of claim 11, further comprising:
    responsive to completing a specified numbers of traversals of the callback list, quiesce the processor.

17. The computer system of claim 11, further comprising:
    responsive to failing to detect, by the I/O worker task, a pending I/O request, create a new entry in the callback list.

18. A non-transitory computer-readable storage medium comprising executable instructions that, when executed by a processor of a host computer system running a plurality of virtual machines, cause the processor to:
    determine that no input/output (I/O) worker tasks associated with the plurality of virtual machines are running on the processor;
    invoke, by a hypervisor of the host computer system, a callback dispatcher task;
    identify, by the callback dispatcher task, an entry of a callback list, wherein the entry references a callback code within an input/output (I/O) worker task running under the hypervisor and associated with a virtual machine of the plurality of virtual machines;
    invoke the callback code referenced by the entry of the callback list; and
    responsive to identifying, by the callback code, a pending I/O request associated with the virtual machine, wake up, by the callback code, the input/output (I/O) worker task referenced by the entry of the callback list.

19. The non-transitory computer-readable storage medium of claim 18, further comprising executable instructions that, when executed by a processor, cause the processor to:
    responsive to identifying, by the callback code, the pending I/O request, removing the entry from the callback list.

20. The non-transitory computer-readable storage medium of claim 18, further comprising executable instructions that, when executed by a processor, cause the processor to:
responsive to failing to identify pending I/O requests, retrieving a next entry of the callback list.

* * * * *